United States Patent
Novak et al.

(10) Patent No.: US 12,216,029 B2
(45) Date of Patent: Feb. 4, 2025

(54) LIQUID SHAPING WITH CHARGED PARTICLE BEAMS

(71) Applicant: FEI Company, Hillsboro, OR (US)

(72) Inventors: Libor Novak, Brno (CZ); Tomas Kazda, Brno (CZ)

(73) Assignee: FEI Company, Hillsboro, OR (US)

( * ) Notice: Subject to any disclaimer, the term of this patent is extended or adjusted under 35 U.S.C. 154(b) by 326 days.

(21) Appl. No.: 17/826,782

(22) Filed: May 27, 2022

(65) Prior Publication Data

US 2022/0381654 A1 Dec. 1, 2022

(30) Foreign Application Priority Data

May 28, 2021 (EP) ..................................... 21176708

(51) Int. Cl.
*G01N 1/10* (2006.01)
(52) U.S. Cl.
CPC ..................................... *G01N 1/10* (2013.01)
(58) Field of Classification Search
None
See application file for complete search history.

(56) References Cited

PUBLICATIONS

Rola et al: ("Electron Beam Patterning of Polymerizable Ionic Liquid Films for Application in Photonics", Langmuir, vol. 35, No. 37, Aug. 23, 2019 (Aug. 23, 2019), pp. 11968-11978, XP55861498, ISSN: 0743-7463, DOI: 10.1021 /acs.langmuir.9b00759).*
Yang et al: ("Dynamic behavior of nanoscale liquids in graphene liquid cells revealed by in situ transmission electron microscopy", Micron, Pergamon, Oxford, vol. 116, Sep. 17, 2018 (Sep. 17, 2018), pp. 22-29, XP085529058, ISSN: 0968-4328, DOI: 10.1016/J.MICRON.2018.09.009).*
Rola Krzysztof et al, Electron Beam Patterning of Polymerizable Ionic Liquid Films for Application in Photonics, American Chemical Society, Langmuir, vol. 35, No. 37, Aug. 23, 2019, pp. 11968-11978.
Yang Jiwoong et al, Dynamic behavior of nanoscale liquids in graphene liquid cells revealed by in situ transmission electron microscopy, Micron, Pergamon, Oxford, GB, vol. 116, Sep. 17, 2018, pp. 22-29.
EP Application No. 21176708.2 Extended Search Report issued Nov. 25, 2021.

* cited by examiner

*Primary Examiner* — Andrew Smyth

(57) ABSTRACT

The present invention relates to a method for preparing and/or processing a sample. The sample comprises at least one fluid, and the method comprises directing a charged particle beam onto the at least one fluid and causing the at least one fluid to flow in response to the charged particle beam being directed on to it. The present invention also relates to a system and a computer program product used to carry out the method.

18 Claims, 5 Drawing Sheets

LIQUID SHAPING WITH CHARGED PARTICLE BEAMS

FIELD

The present invention relates to the field of nanotechnology and micromachining. The present invention further relates to a method for preparing and/or processing a sample by irradiating an ionic liquid with a charged particle beam and causing it to flow.

BACKGROUND

Charged particle beams, such as electron and ion beams, are widely used for microscopy, imaging, site-specific analysis, deposition, and ablation of materials. Ion beams in particular, are broadly used in the semiconductor and nanotechnology industry for the manufacturing and/or modifying of microscopic structures, such as microprocessors and micro-batteries. These make use of the ability of ions in the ion beam to interact with atoms of the material they irradiate causing emission of any of photons, electrons, ions, neutral atoms, or molecules. Owing to their short wavelength (because of higher mass of component particles) and their ability to be (electrostatically) focused, ion beams may be used for site-specific sputtering or milling of microscopic (or nanoscopic) structures. For example, focused ion beams comprising Gallium ($Ga^+$) ions may be used for milling features on the order of 10 nm. This may be of particular advantage in preparing microprocessors, or micro-batteries.

Focused ion beams, in particular, are often implemented to fabricate and/or repair integrated circuits. They may be used, often together with a precursor gas, to deposit microscopic layers on a substrate, such as conductive metallic layers. In the domain of micro-batteries, charged particle beams have been used to not only carry out in-situ observations of these micro-batteries, but also for their fabrication. However, their use for fabrication of micro-batteries has been limited and mostly for solid-state batteries, where the electrodes as well as the electrolyte are solids. Solid-state batteries may require a more complex system for fabrication, and may not be stable across a range of temperatures. Thus, it may be preferable to use a liquid electrolyte in micro-batteries. A liquid electrolyte that may be used in such micro-batteries may comprise a metallic liquid or an ionic liquid.

Ionic liquids are salts with low melting points (e.g., below 100° C.) and typically low vapor pressures that may be particularly suited for application as electrolytes in micro- or nano-batteries. Owing to their low vapor pressure, they may retain their liquid state even at low pressures, allowing them to be used for in-situ observations of micro-batteries that may be carried out using an electron or ion beam microscope, that typically operate at pressures ranging from $10^{-5}$ Pa up to $10^{-2}$ Pa.

Typically, a liquid electrolyte may be introduced into a micro-battery by a liquid injection system that may allow pushing an electrolyte between two microscopic (or nanoscopic) electrodes. Randolph et. al., *Capsule-free fluid delivery and beam-induced electrodeposition in a scanning electron microscope*, RSC Adv., 2013, 3, 20016, for example, demonstrates use of nanocapillaries to deliver aqueous, electrolytic copper sulphate ($CuSO_4$) solution into the low vacuum chamber of a scanning electron microscope. However, the liquid injection system may have to be installed in addition to the microscope system used for observation of the battery operation. This may increase the complexity of the system and its liability to malfunction. This may also reduce efficiency as different systems may have to be integrated and operated. Embodiments of the present technology aim to simplify and improve efficiency of the preparation and observation of micro-batteries.

Further, embodiments of the present technology may also be employed to prepare and/or process different samples not restricted to micro-batteries. For example, it may be used to cause and/or control flow of fluids, wherein the flow occurs over substrates with sizes ranging from 1 µm to 1 cm. This may be of relevance in any of preparation, processing, and/or analysis of biological samples, for example.

SUMMARY

The present invention relates to aspects that may be used to further improve the fabrication and/analysis of micro-batteries and parts thereof, as well as a corresponding method. However, it should be understood that at least some of the embodiments described herein may also be used in fields different to battery systems.

The present invention seeks to overcome or at least alleviate the shortcomings and disadvantages of the prior art. More particularly, it is an object of the present invention to provide an improved method, system and computer program product for material preparation and analysis.

It is an optional object of the invention to provide a system and method for preparing a microscopic sample, such as a micro-battery. Particularly it is an optional object of this invention to allow for a controlled flow of liquids (such as ionic liquids) through irradiation of said liquids with a charged particle beam.

In a first aspect, the present invention relates to a method for preparing and/or processing a sample, wherein the sample comprises at least one fluid, and wherein the method comprises directing a charged particle beam onto the at least one fluid and causing the at least one fluid to flow in response to the charged particle beam being directed on to it. The process may be carried out in a low-pressure (high-vacuum) environment, with a pressure ranging from $10^{-5}$ Pa to $10^{-2}$ Pa for example, so as to minimize interaction between the charged particles in the charged particle beam and air molecules. This may help improve the efficiency of the process. In this case, the at least one fluid may be a liquid with a low vapor pressure.

The method may comprise directing the charged particle beam by focusing it. The focusing may be carried out by a dedicated assembly comprising electro-optical and/or electromagnetic lenses. The focusing properties of the focusing assembly may be changed by changing a current through the electromagnetic lenses that would change a corresponding magnetic field, for example.

The at least one fluid may comprise an electrical conductor.

The at least one fluid may comprise an ionic conductor.

The ionic conductor may comprise an ionic liquid.

The ionic liquid may comprise a low temperature ionic liquid, that has a melting point at or below room temperature.

The ionic liquid may comprise organic cations, such as 1-ethyl-3-methylimidazolium (EMIM), 1-butyl-3-methylimidazolium (BMIM), 1-octyl-3 methylimidazolium (OMIM), 1-decyl-3-methylimidazolium (DMIM), 1-butyl-2,3-dimethylimidazolium (DBMIM), 1-butyl-2,3-dimethylimidazolium (BMMIM), N-butyl-N-methylpyrrolidinium (PYR14), N-methyl-N-propyl pyrrolidinium (PMPyr), N-methyl-N-propyl piperidinium (PP13), N-methyl-N-propyl pyrrolidinium (PYR13), or other organic cations.

The at least one fluid as described above may comprise a vapor pressure below $10^{-2}$ Pa, preferably below $10^{-5}$ Pa.

A viscosity of the at least one fluid may decrease with increasing temperature.

The decrease in the viscosity of the at least one fluid may range from at least 10% to at most 100% of the viscosity at 25° C., when the at least one fluid is heated from 25° C. to 50° C. The dependence of viscosity on temperature may be, for example, exponential, of a form similar to the Arrhenius equation. The decrease in viscosity may allow the at least one fluid to flow more easily allowing it to be positioned as desired.

The charged particle beam described above may comprise a plurality of charged particles.

The plurality of charged particles may comprise positively charged ions.

Alternatively, the plurality of charged particles may comprise electrons. The larger mass of ions may allow for a better spatial resolution as well as greater momentum exchange with the constituent particles of the at least one fluid. This in turn, may help to improve the efficiency of energy transfer from the charged particle beam to the at least one fluid.

The positively charged ions may comprise any of Ga, Xe, Ar, O, or N ions.

The plurality of charged particles may comprise a beam current, wherein the beam current may range from at least 1 pA to at most 100 µA, preferably from at least 1 pA to at most 1 µA.

The method may further comprise focusing the charged particle beam on to the at least one fluid and scanning over the fluid such that the charged particle beam current density ranges from at least 5 fA/µm$^2$ to at most 50 pA/µm$^2$ preferably from at least 0.05 pA/µm$^2$ to at most 5 pA/µm$^2$. A lower current density may not be enough to cause flow of the fluid whereas a very high temperature may damage the fluid, through temperature induced chemical changes, for example. Thus, an optimum current density may be chosen/set based on the chemical composition of the at least one fluid as well as on the composition of the charged particle beam. The optimum current density may further depend on the energy of the charged particles in the charged particle beam. Moreover, a higher current density may be used for lower energy of the charged particles.

The method may further comprise accelerating the plurality of charged particles within the charged particle beam by applying a voltage.

The energy of the accelerated charged particles may range from at least 0.1 keV to at most 1 MeV. Higher energies may be of particular relevance when the present method is carried out using a Transmission Electron Microscope (TEM).

The method may further comprise transferring the at least one fluid onto a substrate. The term 'substrate' may be construed to include any surface on which the at least one fluid may be placed. For example, it may correspond to the surface of a sample holder of a Scanning Electron Microscope (SEM) system, in case the method is carried out using an SEM. Alternatively, it may be a special holder designed for the purpose of carrying out the method.

The method may comprise transferring the at least one fluid on to the substrate.

The at least one fluid may be transferred on to the substrate by means of a pipette. The pipette may deliver a volume ranging from at least 1 nL to 1 µL, or a droplet size from 0.1 mm to 1 mm, for example, and may have microscopic dimensions itself.

The method may further comprise directing the charged particle beam to a scan point on the at least one fluid. The scan point may comprise the point on to which the charged particle beam may be focused, for example. The scan point may further correspond to the electron or ion spot on the sample.

The method may further comprise scanning the charged particle beam over a plurality of scan locations in one, two, or three dimensions across the at least one fluid. For purposes of scanning in three dimensions, for instance, a plurality of charged particle beams may be employed, each of which may scan in 2 perpendicular planes, for example. Alternatively, by controlling the energy of the charged particles in the charged particle beam, the effective depth at which interaction takes place may also be varied thus allowing a three-dimensional scanning of the at least one fluid.

The method may comprise the charged particle beam scanning the surface of the at least one fluid at a rate between $10^{-10}$ m/s and $10^7$ m/s, preferably between $10^{-4}$ m/s and 100 m/s. It will be appreciated that these rates may represent average rates and/or instantaneous rates at which a given surface area of the at least one fluid may be scanned. In other words, the present ranges may be understood to also correspond to the total time needed to scan a particular surface area of the at least one fluid.

The substrate as described above may comprise any of Silicon Nitride (SiN), Aluminum (Al), or any other materials. This may allow, for example, an electrically non-conducting substrate to be used for fabricating micro-batteries, for example, if the at least one fluid corresponds to an electrolyte. A current may then be measured by placing a pair of electrodes in contact with the electrolyte and establishing a voltage difference between the electrodes, for example.

The sample may further comprise a plurality of conducting elements, e.g., 2 conducting elements.

The two conducting elements may comprise electrodes such that one conducting element comprises an anode and the other conducting element comprises a cathode. Thus, the two conducting elements may comprise the electrodes of a battery.

The plurality of conducting elements may range in size from at least 1 nm to at most 50 cm. Conducting elements at the small end of this range may enable fabrication of nano-batteries using the method presented in this invention, while larger batteries may be enabled by using conducting elements at the other end of the range.

The two conducting elements described above may be located a distance greater than 1 nm from each other.

The cathode may comprise any of Lithium Titanate Oxide (LTO), Lithium Nickel Manganese Cobalt Oxide (NMC), Lithium Iron Phosphate (LFP), Lithium Iron Manganese Phosphate (LFMP), Lithium Manganese Oxide (LMO), Lithium Nickel Manganese Oxide (LNMO), Lithium Nickel Cobalt Aluminum Oxide (NCA), Lithium Cobalt Oxide (LCO), Sulphur (S), or any other material used for cathodes in batteries. In particular, it may comprise any material used for cathodes in batteries with liquid electrolytes.

The anode may comprise any of Lithium (Li), Graphite, Silicon, Lithium Titanate Oxide (LTO), Tin (Sn), or any other material used for anodes in batteries. In particular, it may comprise any material used for anodes in batteries with liquid electrolytes.

A result of scanning the charged particle beam over the scan locations across the at least one fluid may comprise an interaction of the charged particle beam with the at least one fluid. The interaction may be mechanical resulting in transfer of energy from the charged particle beam to the component particles (e.g., ions, atoms, or molecules) of the at least one fluid. The transfer of energy may result in the viscosity of the at least one fluid being decreased.

A result of the interaction between the charged particle beam and the at least one fluid may comprise a flow of the at least one fluid across the substrate.

The at least one fluid as described above may further comprise an electrolyte. As described above, this may allow a current to flow between the plurality of conducting elements if an electric potential difference is established between them.

The method as described above may further comprise a lift-out step and a transfer step. These steps may be carried out to fabricate the plurality of conducting elements described above.

The lift-out step may comprise milling and removing the plurality of conducting elements from a plurality of bulk samples. Generally, bulk samples of any of the materials comprising the conducting elements as described above may be used to fabricate the conducting elements.

The lift-out step may comprise extracting the Li conducting element from a lithium bulk sample. It may be appreciated that bulk samples for any of the other materials described above may be used to extract anodic conducting elements.

The lift-out step may comprise extracting the LTO conducting element from a lithium titanate bulk sample. It may be appreciated that bulk samples for any of the other materials described above may be used to extract cathodic conducting elements.

The transfer step described above may comprise transferring any of the plurality of conducting elements on to the substrate.

The step of transferring the at least one fluid on to the substrate may precede the step of transferring any of the plurality of conducting elements on to the substrate. Alternatively, at least one of the conducting elements may be transferred on to the substrate followed by transferring the at least one fluid on to the substrate followed further by transferring the remaining of the plurality of conducting elements on to the substrate.

A result of the interaction between the charged particle beam and the at least one fluid may comprise transferring, at least a part of, the fluid to an area on the substrate, wherein the area corresponds to the gap between the two conducting elements. This may be of advantage in case the method described here is used to prepare a battery, for example, where the at least one fluid may be used to provide a conducting path between the plurality of conducting elements. Controlling the flow of the at least one fluid using the charged particle beam as described above may allow pushing even a very small volume of fluid (of ~1 pL volume) into a space of ~10 µm between, e.g., two conducting elements accurately and without the need for a separate liquid injection system in addition to a fabrication/imaging system.

Any of the plurality of conducting elements described above may be transferred onto the substrate described above by means of a needle.

The needle may comprise a microscopic needle. The needle may also comprise a nanoscopic needle in case the conducting elements have nanoscopic dimensions.

The substrate may comprise a sample holder. As described above, at least part of, the sample holder may itself comprise the substrate such that a separate substrate may not be used.

The sample holder may comprise an SEM sample holder.

The sample holder may comprise a plurality of arms, such as 2 arms, each configured to provide a conducting contact to at least one of the plurality of conducting elements. The plurality of arms may thus allow a voltage difference to be established between any of the plurality of conducting elements with the help of an external voltage source, for example. This may be of particular advantage in case the conducting elements are of nanoscopic or microscopic dimensions and connecting them to an external voltage source may require a sophisticated process.

Each of the plurality of arms may be connected to a voltage source such that a non-zero potential difference can be generated between any two of the plurality of arms.

The method as described above may comprise transferring any of the plurality of conducting elements onto any of the plurality of arms of the sample holder.

The method may further comprise monitoring the flow of the at least one fluid in response to the charged particle beam being directed on to it.

The method may further comprise applying a non-zero potential difference between the anode and the cathode and measuring a current between them.

The method may further comprise stopping the flow of the at least one fluid between the two conducting elements once a non-zero current is measured between the anode and the cathode.

Monitoring the flow of the at least one fluid may further comprise imaging the sample. In particular, imaging of the sample may be carried out in parallel with any of the steps described above including irradiation of the at least one fluid with the charged particle and/or the lift-out and transfer steps. This may be of particular advantage in controlling each of these processes (such as the stop time) and may help to improve the efficiency of the sample preparation and/or processing method. The images may also be recorded by, for example, a data processing system that may be used together with a system to carry out the method described here.

Imaging the sample may comprise detecting emissions arising from interaction of the charged particle beam with the at least one fluid.

The emissions may comprise photons, electrons, or ions. The electrons may comprise any of backscattered electrons, transmitted electrons, secondary electrons, or auger electrons. The ions may comprise secondary ions. The photons may comprise a frequency spectrum ranging from IR to X-rays, for example.

The image may comprise an SEM image, a TEM image, and/or an FIB image.

In a second aspect, the present invention relates to a system comprising a scanning microscope system and a data processing system, wherein the system is configured for processing a sample, wherein the sample comprises at least one fluid, and wherein the system is configured to direct a charged particle beam onto the at least one fluid and causing the at least one fluid to flow in response to the charged particle beam being directed on to it.

Directing the charged particle beam may comprise focusing the charged particle beam.

The scanning microscope system may comprise a Focused Ion Beam (FIB) microscope.

The system, particularly the scanning microscope system, may be configured for scanning the charged particle beam over a plurality of scan points in one, two or three dimensions across the at least one fluid.

The system, in particular the data processing system, may be further configured for assigning a two-dimensional coordinate system to the sample.

The system as described above may be configured to monitor a flow of the at least one fluid, wherein monitoring the flow of the at least one fluid may further comprise imaging the sample.

The system, particularly the scanning microscope system, may be further configured to image the sample by detecting emissions arising from the interaction of the charged particle beam with the at least one fluid.

The system, particularly the data processing system, may comprise a data storage element, wherein the system may be configured to store images of the sample in the data storage element.

The system may further comprise a display, and the system may be configured to display the sample images on the display.

The system, particularly the data processing system as described above, may be configured to allow an operator to monitor the flow of the at least one fluid based on the images displayed.

The system, particularly the data processing system as described above, may be configured to control the scan position of the charged particle beam on the co-ordinate system associated with the sample by controlling the direction of the charged particle beam.

The system, particularly the scanning microscope system described above, may comprise an electro-optical system configured to direct and/or focus the charged particle beam.

The system, particularly the data processing system as described above, may be further configured to control the electro-optical system, and wherein the data processing system is configured to control the direction of the charged particle beam by controlling the electro-optical system.

Below, embodiments of a method will be discussed. The method embodiments are abbreviated by the letter "M" followed by a number. Whenever reference is herein made to the "method embodiments", these embodiments are meant.

M1. A method for preparing and/or processing a sample, wherein the sample comprises at least one fluid, and wherein the method comprises
  directing a charged particle beam onto the at least one fluid and causing the at least one fluid to flow in response to the charged particle beam being directed on to it.

M2. The method according to the preceding embodiment, wherein directing the charged particle beam comprises focusing it.

M3. The method according to any of the preceding embodiments, wherein the at least one fluid comprises an electrical conductor.

M4. The method according to any of the preceding embodiments, wherein the at least one fluid comprises an ionic conductor.

M5. The method according to the preceding embodiment, wherein ionic conductor comprises an ionic liquid.

M6. The method according to the preceding embodiment, wherein the ionic liquid comprises a low temperature ionic liquid, that has melting point at or below room temperature.

M7. The method according to preceding embodiment, wherein the ionic liquid comprises organic cations, such as 1-ethyl-3-methylimidazolium (EMIM), 1-butyl-3-methylimidazolium (BMIM), 1-octyl-3 methylimidazolium (OMIM), 1-decyl-3-methylimidazolium (DMIM), 1-butyl-2,3-dimethylimidazolium (DBMIM), 1-butyl-2,3-dimethylimidazolium (BMMIM), N-butyl-N-methylpyrrolidinium (PYR14), N-methyl-N-propyl pyrrolidinium (PMPyr), N-methyl-N-propyl piperidinium (PP13), N-methyl-N-propyl pyrrolidinium (PYR13), or other organic cations.

M8. The method according to any of the preceding embodiments, wherein the at least one fluid comprises a vapor pressure below $10^{-2}$ Pa, preferably below $10^{-5}$ Pa.

M9. The method according to any of the preceding embodiments, wherein a viscosity of the at least one fluid decreases with increasing temperature.

M10. The method according to the preceding embodiment, wherein the decrease in the viscosity of the at least one fluid ranges from at least 10% to at most 100% of the viscosity at 25° C., when the at least one fluid is heated from 25° C. to 50° C.

M11. The method according to any of the preceding embodiments, wherein the charged particle beam comprises a plurality of charged particles.

M12. The method according to the preceding embodiment, wherein the plurality of charged particles comprises positively charged ions.

M13. The method according to the penultimate embodiment, wherein the plurality of charged particles comprises electrons.

M14. The method according to the penultimate embodiment, wherein the positively charged ions comprise any of Ga, Xe, Ar, O, or N ions.

M15. The method according to any of the preceding embodiments and with the features of embodiment M11, wherein the plurality of charged particles comprise a beam current, and wherein the beam current ranges from at least 1 pA to at most 100 µA, preferably from at least 1 pA to at most 1 µA.

M16. The method according to the preceding embodiment, wherein the method further comprises focusing the charged particle beam on to the at least one fluid and scanning over the fluid such that the charged particle beam current density ranges from at least 5 fA/µm² to at most 50 pA/µm² preferably from at least 0.05 pA/µm² to at most 5 pA/µm².

M17. The method according to any of the preceding embodiments and with the features of embodiment M11, wherein the method comprises accelerating the plurality of charged particles within the charged particle beam by applying a voltage.

M18. The method according to the preceding embodiment, wherein the energy of the accelerated charged particles ranges from at least 0.1 keV to at most 1 MeV.

M19. The method according to any of the preceding embodiments, wherein the method further comprises transferring the at least one fluid onto a substrate.

M20. The method according to the preceding embodiment, wherein the method comprises transferring the at least one fluid on to the substrate.

M21. The method according to the preceding embodiment, wherein the at least one fluid is transferred on to the substrate by means of a pipette.

M22. The method according to any of the preceding embodiments, wherein the method further comprises directing the charged particle beam to a scan point on the at least one fluid.

M23. The method according to the preceding embodiment, wherein the method further comprises scanning the charged particle beam over a plurality of scan locations in one, two, or three dimensions across the at least one fluid.

M24. The method according to any of the 2 preceding embodiments, wherein the method comprises the charged particle beam scanning the surface of the at least one fluid at a rate between $10^{-10}$ m/s and $10^7$ m/s, preferably between $10^{-4}$ m/s and 100 m/s.

M25. The method according to any of the preceding embodiments and with the features of embodiment M19, wherein the substrate comprises any of SiN, Al, or any other materials.

M26. The method according to any of the preceding embodiments, wherein the sample further comprises a plurality of conducting elements, e.g., 2 conducting elements.

M27. The method according to the preceding embodiment, wherein the two conducting elements comprise electrodes such that one conducting element comprises an anode and the other conducting element comprises a cathode.

M28. The method according to any of the 2 preceding embodiments, wherein each of the plurality of conducting elements ranges in size from at least 1 nm to at most 50 cm.

M29. The method according to any of the 3 preceding embodiments, wherein the two conducting elements are located a distance greater than 1 nm from each other.

M30. The method according to any of the preceding embodiments and with the features of embodiment M27, wherein the cathode comprises any of Lithium Titanate (LTO).

M31. The method according to any of the preceding embodiments and with the features of embodiment M27, wherein the anode comprises Lithium (Li).

M32. The method according to the preceding embodiment and with the features of embodiment M23, wherein a result of scanning the charged particle beam over the scan locations across the at least one fluid comprises an interaction of the charged particle beam with the at least one fluid.

M33. The method according to the preceding embodiment and with the features of embodiment M19, wherein a result of the interaction between the charged particle beam and the at least one fluid comprises a flow of the at least one fluid across the substrate.

M34. The method according to the preceding embodiment and with the features of embodiment M3, wherein the at least one fluid comprises an electrolyte.

M35. The method according to any of the preceding, wherein the method further comprises a lift-out step and a transfer step.

M36. The method according to the preceding embodiment and with the features of embodiment M26, wherein the lift-out step comprises milling and removing the plurality of conducting elements from a plurality of bulk samples.

M37. The method according to the preceding embodiment and with the features of embodiment M31, wherein the lift-out step comprises extracting the Li conducting element from a lithium bulk sample.

M38. The method according to any of the 2 preceding embodiments and with the features of embodiment M30, wherein the lift-out step comprises extracting the LTO conducting element from a lithium titanate bulk sample.

M39. The method according to any of the preceding embodiments and with the features of embodiments M19, M26, and M35, wherein the transfer step comprises transferring any of the plurality of conducting elements on to the substrate.

M40. The method according to the preceding embodiment and with the features of embodiment M11, wherein the step of transferring the at least one fluid on to the substrate precedes the step of transferring any of the plurality of conducting elements on to the substrate.

M41. The method according to any of the preceding embodiments and with the features of embodiments M29, M23, and M39, wherein a result of the interaction between the charged particle beam and the at least one fluid comprises transferring, at least a part of, the fluid to an area on the substrate, wherein the area corresponds to the gap between the two conducting elements.

M42. The method according to any of the preceding embodiments and with the features of embodiment M39, wherein any of the plurality of conducting elements are transferred onto the substrate by means of a needle.

M43. The method according to the preceding embodiment, wherein the needle comprises a microscopic needle.

M44. The method according to any of the preceding embodiments and with the features of embodiment M19, wherein the substrate comprises a sample holder.

M45. The method according to the preceding embodiment, wherein the sample holder comprises an SEM sample holder.

M46. The method according to any of the 2 preceding embodiments and with the features of embodiment M26, wherein the sample holder comprises a plurality of arms, such as 2 arms, each configured to provide a conducting contact to at least one of the plurality of conducting elements.

M47. The method according to the preceding embodiment, wherein each of the plurality of arms is connected to a voltage source such that a non-zero potential difference can be generated between any two of the plurality of arms.

M48. The method according to any of the 3 preceding embodiments and with the features of embodiment M39, wherein transferring any of the plurality of conducting elements on to the substrate comprises transferring any conducting element onto any of the plurality of arms of the sample holder.

M49. The method according to any of the preceding embodiments, wherein the method further comprises monitoring the flow of the at least one fluid in response to the charged particle beam being directed on to it.

M50. The method according to the preceding embodiment and with the features of embodiments M27, and M47, wherein the method further comprises applying a non-zero potential difference between the anode and the cathode and measuring a current between them.

M51. The method according to the preceding embodiment, wherein the method further comprises stopping the flow of the at least one fluid between the two conducting elements once a non-zero current is measured between the anode and the cathode.

M52. The method according to any of the preceding embodiments and with the features of embodiment M49, wherein monitoring the flow of the at least one fluid further comprises imaging the sample.

M53. The method according to the preceding embodiment and with the features of embodiment M33, wherein imaging the sample comprises detecting emissions arising from interaction of the charged particle beam with the at least one fluid.

M54. The method according to the preceding embodiment, wherein the emissions comprise photons.

M55. The method according to any of the 2 preceding embodiments, wherein the emissions comprise electrons.

M56. The method according to the preceding embodiment, wherein the electrons comprise any of backscattered electrons, transmitted electrons, secondary electrons, or auger electrons.

M57. The method according to any of the 4 preceding embodiments, wherein the emissions comprise ions.

M58. The method according to the preceding embodiment, wherein the ions comprise secondary ions.

M59. The method according to any of the preceding embodiments and with the features of embodiment M55, wherein the image comprises an SEM image.

M60. The method according to any of the preceding embodiments and with the features of embodiment M55, wherein the image comprises a TEM image.

M61. The method according to any of the preceding embodiments and with the features of any of embodiments M55, and M57, wherein the image comprises an FIB image.

Below, embodiments of a system will be discussed. The system embodiments are abbreviated by the letter "S" followed by a number. Whenever reference is herein made to the "system embodiments", these embodiments are meant.

S1. A system comprising a scanning microscope system and a data processing system, wherein the system is configured for processing a sample, wherein the sample comprises at least one fluid, and wherein the system is configured to
- direct a charged particle beam onto the at least one fluid and causing the at least one fluid to flow in response to the charged particle beam being directed on to it.

S2. The system according to the preceding embodiment, wherein directing the charged particle beam comprises focusing the charged particle beam.

S3. The system according to any of the preceding system embodiments, wherein the at least one fluid comprises an electrical conductor.

S4. The system according to any of the preceding system embodiments, wherein the at least one fluid comprises an ionic conductor.

S5. The system according to any of the preceding system embodiments, wherein the at least one fluid comprises an ionic liquid.

S6. The system according to the preceding embodiment, wherein the ionic liquid comprises a low temperature ionic liquid, that has melting point at or below room temperature.

S7. The system according to preceding embodiment, wherein the ionic liquid comprises 1-ethyl-3-methylimidazolium (EMIM), 1-butyl-3-methylimidazolium (BMIM), 1-octyl-3 methylimidazolium (OMIM), 1-decyl-3-methylimidazolium (DMIM), 1-butyl-2,3-dimethylimidazolium (DBMIM), 1-butyl-2,3-dimethylimidazolium (BMMIM), N-butyl-N-methylpyrrolidinium (PYR14), N-methyl-N-propyl pyrrolidinium (PMPyr), N-methyl-N-propyl piperidinium (PP13), N-methyl-N-propyl pyrrolidinium (PYR13), or other organic cations.

S8. The system according to any of the preceding system embodiments, wherein the at least one fluid comprises a vapor pressure below $10^{-2}$ Pa, preferably below $10^{-5}$ Pa.

S9. The system according to any of the preceding system embodiments, wherein a viscosity of the at least one fluid decreases with increasing temperature.

S10. The system according to the preceding embodiment, wherein the decrease in the viscosity of the at least one fluid ranges from at least 10% to at most 100% of the viscosity at 25° C., when the liquid is heated from 25° C. to 50° C.

S11. The system according to any of the preceding system embodiments, wherein the charged particle beam comprises a plurality of charged particles.

S12. The system according to the preceding embodiment, wherein the plurality of charged particles comprises positively charged ions.

S13. The system according to the penultimate embodiment, wherein the plurality of charged particles comprises electrons.

S14. The system according to the penultimate embodiment, wherein the positively charged ions comprise any of Ga, Xe, Ar, O, or N ions.

S15. The system according to any of the preceding system embodiments, wherein the scanning microscope system comprises a Focused Ion Beam (FIB) microscope.

S16. The system according to any of the preceding system embodiments and with the features of embodiment S11, wherein the plurality of charged particles comprises a beam current, and wherein the beam current ranges from at least 1 pA to at most 100 μA, preferably from at least 1 pA to at most 1 μA.

S17. The system according to the preceding embodiment, wherein the system, particularly the scanning microscope system, is configured to focus the charged particle beam on to the at least one fluid and scan over the fluid such that the charged particle beam current density ranges from at least 5 fA/μm² to at most 5 pA/μm², preferably from at least 0.05 pA/μm² to at most 5 pA/μm².

S18. The system according to any of the preceding system embodiments and with the features of embodiment S11, wherein the system, particularly the scanning microscope system, is configured for accelerating the plurality of charged particles within the charged particle beam by applying a voltage.

S19. The system according to the preceding embodiment, wherein the energy of the accelerated charged particles ranges from at least 0.1 keV to at most 1 MeV.

S20. The system according to any of the preceding system embodiments, wherein the system, particularly the scanning microscope system, further comprises a substrate.

S21. The system according to the preceding embodiment, wherein the system, particularly the scanning microscope system, is configured for transferring the at least one fluid onto the substrate by means of a pipette.

S22. The system according to any of the preceding system embodiments, wherein the system, particularly the scanning microscope system, is further configured for directing the charged particle beam to a scan point on the at least one fluid.

S23. The system according to the preceding embodiment, wherein the system, particularly the scanning microscope system, is configured for scanning the charged particle beam over a plurality of scan locations in one, two or three dimensions across the at least one fluid.

S24. The system according to any of the preceding system embodiments, wherein the system, in particular the data processing system, is further configured for assigning a two-dimensional coordinate system to the sample.

S25. The system according to any of the two preceding embodiments, wherein the system, particularly the scanning microscope system, is configured for scanning the charged particle beam over the surface of the at least one fluid at a rate between $10^{-10}$ m/s and $10^7$ m/s, preferably between $10^{-4}$ m/s and 100 m/s.

S26. The system according to any of the preceding system embodiments and with the features of embodiment S20, wherein the substrate comprises any of SiN, Al, or any other materials.

S27. The system according to any of the preceding system embodiments, wherein the sample further comprises at least two or a plurality of conducting elements.

S28. The system according to the preceding embodiment, wherein the two conducting elements comprise electrodes such that one conducting element comprises an anode and the other conducting element comprises a cathode.

S29. The system according to any of the two preceding embodiments, wherein each of the at least two conducting elements ranges in size from at least 1 nm to at most 50 cm.
S30. The system according to any of the three preceding embodiments, wherein the two conducting elements are located at a distance greater than 1 nm from each other.
S31. The system according to any of the preceding system embodiments and with the features of embodiment S28, wherein the cathode comprises Lithium Titanate (LTO).
S32. The system according to any of the preceding system embodiments and with the features of embodiment S28, wherein the anode comprises Lithium (Li).
S33. The system according to any of the preceding system embodiments and with the features of embodiment S23, wherein a result of scanning the charged particle beam over the scan locations across the at least one fluid comprises an interaction of the charged particle beam with the at least one fluid.
S34. The system according to the preceding embodiment and with the features of embodiment S20, wherein a result of the interaction between the charged particle beam and the at least one fluid comprises a flow of the at least one fluid across the substrate.
S36. The system according to any of the preceding system embodiments and with the features of embodiments S27, wherein the system, particularly the scanning microscope system, is configured for milling and removing the at least two conducting elements from at least two respective bulk samples by means of the charged particle beam.
S37. The system according to any of the preceding system embodiments, wherein the system, particularly the scanning microscope system, is configured for extracting the Li conducting element from a lithium bulk sample by means of the charged particle beam.
S38. The system according to any of the 2 preceding embodiments, wherein the system, particularly the scanning microscope system, is configured for extracting the LTO conducting element from a lithium titanate bulk sample by means of the charged particle beam.
S39. The system according to any of the preceding system embodiments and with the features of embodiment S20, wherein the substrate comprises a sample holder.
S40. The system according to the preceding embodiment, wherein the sample holder comprises an SEM sample holder.
S41. The system according to any of the 2 preceding embodiments, wherein the sample holder comprises a plurality of arms, such as 2 arms, each configured to provide a conducting contact to at least one of the conducting elements.
S42. The system according to the preceding embodiment, wherein each of the plurality of arms is connected to a voltage source such that a non-zero potential difference can be generated between any two of the plurality of arms.
S43. The system according to any of the preceding system embodiments and with the features of embodiments S20, and S27, wherein the system is configured for transferring any of the conducting elements on to the substrate (e.g. the sample holder) by means of a needle, wherein the needle comprises a microscopic needle.
S44. The system according to the preceding embodiment and with the features of embodiment S41, wherein transferring any of the plurality of conducting elements on to the substrate comprises transferring any conducting element onto any of the plurality of arms of the sample holder.
S45. The system according to the preceding embodiment and with the features of embodiment S20, wherein the step of transferring the at least one fluid on to the substrate precedes the step of transferring any of the plurality of conducting elements on to the substrate.
S46. The system according to any of the preceding system embodiments and with the features of embodiment S34, wherein a result of the interaction between the charged particle beam and the at least one fluid comprises transferring the fluid or a portion thereof to an area on the substrate, wherein the area corresponds to the gap between the at least two conducting elements.
S47. The system according to any of the preceding system embodiments, wherein the system is further configured to monitor the flow of the at least one fluid in response to the charged particle beam being directed on to it.
S48. The system according to any of the preceding system embodiments, wherein the system is configured for applying a non-zero voltage potential difference between the anode and the cathode and measuring a current between them.
S49. The system according to the preceding embodiment, wherein the system is further configured for stopping the flow of the at least one fluid between the two conducting elements once a non-zero current is measured between the anode and the cathode.
S50. The system according to any of the 3 preceding embodiments and with the features of embodiment S47, wherein monitoring the flow of the at least one fluid further comprises imaging the sample.
S51. The system according to the preceding embodiment and with the features of embodiment S33, wherein the system, particularly the scanning microscope system, is further configured to image the sample by detecting emissions arising from the interaction of the charged particle beam with the at least one fluid.
S52. The system according to the preceding embodiment, wherein the emissions comprise photons.
S53. The system according to any of the 2 preceding embodiments, wherein the emissions comprise electrons.
S54. The system according to the preceding embodiment, wherein the electrons comprise any of backscattered electrons, transmitted electrons, secondary electrons, or auger electrons.
S55. The system according to any of the 4 preceding embodiments, wherein the emissions comprise secondary ions.
S56. The system according to any of the preceding system embodiments and with the features of embodiment S51, wherein the image comprises an SEM image.
S57. The system according to any of the preceding system embodiments and with the features of embodiment S51, wherein the image comprises a TEM image.
S58. The system according to any of the preceding system embodiments and with the features of embodiment S51, wherein the image comprises an FIB image.
S59. The system according to any of the preceding system embodiments and with the features of embodiment S51, wherein the system, particularly the data processing system, comprises a data storage element, and wherein the system is configured to store images of the sample in the data storage element.
S60. The system according to the preceding embodiment, wherein the system further comprises a display, and wherein the system is configured to display the sample images on the display.
S61. The system according to the preceding embodiment, wherein the system, particularly the data processing system, is configured to allow monitoring the flow of the at least one fluid based on the images displayed.

S62. The system according to any of the preceding system embodiments and with the features of embodiments S23, and S24, wherein the system, particularly the data processing system, is configured to control the scan position of the charged particle beam on the co-ordinate system associated with the sample by controlling the direction of the charged particle beam.

S63. The system according to any of the preceding system embodiments and with the features of embodiment S2, wherein the system, particularly the scanning microscope system, comprises an electro-optical system configured to direct and/or focus the charged particle beam.

S64. The system according to the 2 preceding embodiments, wherein the system, particularly the data processing system, is further configured to control the electro-optical system, and wherein the data processing system is configured to control the direction of the charged particle beam by controlling the electro-optical system.

S65. The system according to any of the 3 preceding embodiments, wherein the scanning microscope system comprises at least two or a plurality of electro-optical lenses.

S66. The system according to the preceding embodiment, wherein the electro-optical lenses comprise at least one condenser lens and at least one objective lens.

S67. The system according to any of the preceding system embodiments, wherein processing the sample comprises a deposition onto and/or an ablation of the sample or parts thereof.

Below, embodiments of a computer program product will be discussed.

P1. A computer program product comprising instructions, when run on a data processing system of a system according to any of the preceding system embodiments, to perform the method according to any of the preceding method embodiments.

Exemplary features of the invention are further detailed in the figures and the description of the figures below.

DETAILED FIGURE DESCRIPTION

For the sake of clarity, some features may only be shown in some figures, and others may be omitted. However, also the omitted features may be present, and the depicted and discussed features do not need to be present in all embodiments.

Figure 1:
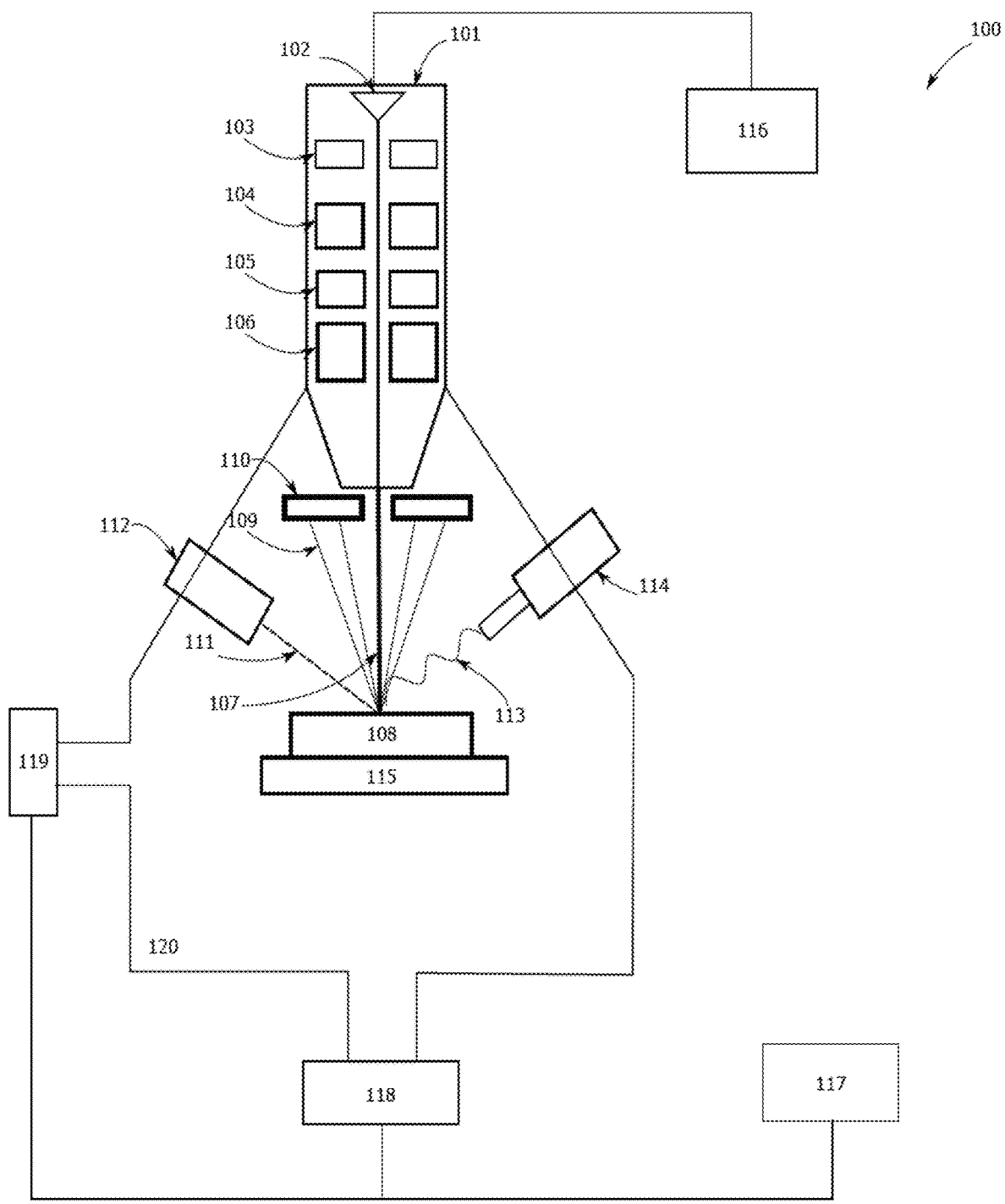
FIG. 1 shows a scanning microscope system.

FIG. 1 shows components of a scanning microscope system 100. The scanning microscope system 100 may be configured for generating a primary beam 107 of charged particles (e.g. electrons or ions). The scanning microscope system 100 may be further configured to direct the primary beam 107 of charged particles on to a sample 108. The scanning microscope system 100 may comprise, for example, a Focused Ion Beam (FIB) microscope or a Scanning Electron Microscope (SEM) 101. In this example, the primary beam comprises an ion beam. The charged particle beam may be generated by a charged particle source 102 configured for emitting the charged particle beam, wherein a voltage may be applied between the charged particle source 102 and an extraction electrode 103. The applied voltage may preferably range from at least 0.1 kV to at most 30 kV. In case the charged particle beam comprises ions, the source 102 may correspond to an ion source, and the extraction electrode 103 may correspond to a cathode. The scanning microscope system 100 may further comprise a directing and/or focusing assembly that may comprise, for example, electromagnetic or electrostatic lenses. The lenses may be configured for controlling the path of the primary beam 107 (ion or electron beam). At least one condensing lens 104 may be comprised by the electromagnetic or electrostatic lenses. The condensing lens 104 may be configured for controlling the size of the primary beam 107. Moreover, at least one objective lens 106 may be comprised by the electromagnetic lenses. The objective lens 106 may be configured for focusing the primary beam 107 to a scan point on the sample 108. The scan point may correspond to an ion or an electron spot on the sample 108 depending on the particles comprising the charged particle beam. Further, the dimensions and the shape of the scan point may depend on the focusing properties of the electromagnetic or electrostatic lenses (e.g. applied current) and the working distance between the FIB microscope 101 and the sample 108. A scanning coil(s) or a deflection electrode(s) 105 may be configured for deflecting the primary beam 107 over a plurality of scan locations in one or two dimensions. Thus, optionally advantageously, this may enable a two-dimensional scanning of the sample.

The scanning microscope system 100 may be configured for detecting first and second emissions 109, 111, 113. The primary beam 107 may interact with particles (such as atoms) of the sample 108. This interaction may result in the first and second emissions. The first emissions may comprise emissions of charged particles, such as secondary electrons and/or secondary ions. The first emissions may also comprise emissions of backscattered, transmitted and/or Auger electrons. Further, the second emissions may comprise emissions of photons across a range of wavelengths, such as X-rays and/or light (e.g. visible light).

In the example of FIG. 1, the scanning microscope system 100 may comprise a first detector 110, wherein the first detector 110 may be configured for detecting backscattered electrons 109 emitted from the scan locations in a sequential manner. Thus, the first detector 110 may comprise a backscattered electron detector, such as a segmented silicon drift detector. However, the backscattered electron detector may also correspond to other types of solid-state detectors. Moreover, the scanning microscope system 100 may comprise a second detector 112, wherein the second detector 112 may be configured for detecting secondary electrons and/or secondary ions 111 emitted from the scan locations in a sequential manner. Thus, the second detector may comprise a secondary electron detector, such as an Everhart-Thornley detector. The second detector may alternatively or additionally comprise a secondary ion detector, such as a charged particle multiplier.

Further, the scanning microscope system may comprise a third detector 114, wherein the third detector 114 may be configured for detecting photons emitted from the scan locations in a sequential manner. Thus, the third detector 114 may comprise, for example, an X-ray detector, wherein the X-ray detector may comprise, for example, a silicon drift detector. However, the third detector 114 may also comprise other types of photon detectors (e.g., photomultipliers or multipixel photon counters). The second and the third detector 112, 114 may be tilted with respect to the surface of the sample 108.

The third detector 114 may be comprised by an energy-dispersive spectrometer (EDS). The energy bandwidth of the EDS may range from 0 to at most 17 keV. In another modality the third detector 114 may be comprised by a wavelength-dispersive spectrometer (WDS). Further, the third detector 114 may also be comprised by an electron energy loss spectrometer or a cathodoluminescence spectrometer.

The sample 108 may be positioned on top of a movable stage 115. The movable stage 115 may be configured for performing two horizontal movements, a vertical movement, a tilting movement, and/or a rotational movement, with respect to the plane of the sample 108. The two horizontal movements may comprise selecting a field of view. The vertical movement may comprise changing the height of the sample 108 and thus the working distance and possibly the image resolution.

The scanning microscope system 100 may further comprise a control unit 116. The control unit 116 may be configured for controlling the power supply and operation of the condensing lens 104, the objective lens 106, the scanning coil(s) or electrode(s) 105 and the movable stage 115. Further, the scanning microscope system 100 may comprise a vacuum system. The vacuum system may comprise a vacuum controller 117, a mechanical pumping system 118, an (ultra-)high vacuum pump 119 (such as an ion pump or a turbomolecular pump) and a vacuum chamber 120. The vacuum controller 117 may be configured for controlling the operation of the mechanical pumping system 118 and the ultra-high vacuum pump 119. The mechanical pumping system 118 and the (ultra-)high vacuum pump 119 may be configured for providing an (ultra-)high vacuum within the vacuum chamber 120. The vacuum chamber 120 may be configured for housing the sample 108, the movable stage 115, the first detector 110 or parts thereof, the second detector 112 or parts thereof, the third detector 114 or parts thereof, and the FIB or SEM microscope 101 or parts thereof.

Figure 2:
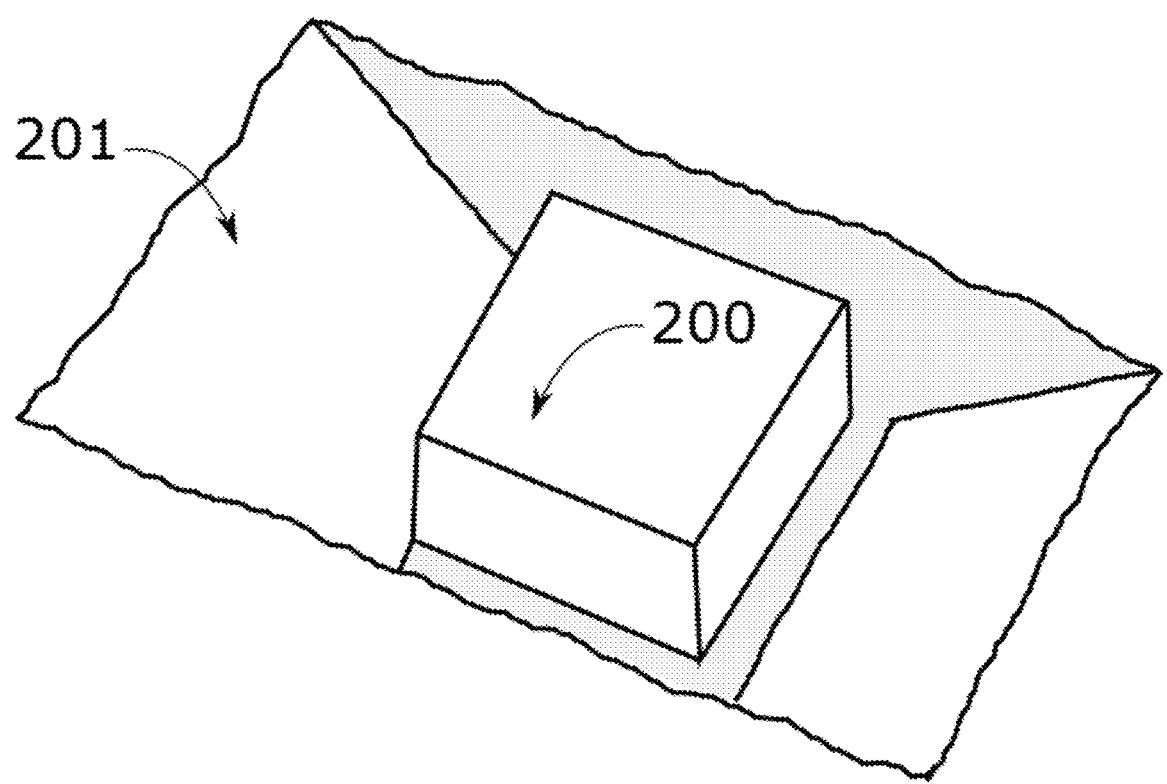
FIG. 2 shows a conducting element and a bulk material.

FIG. 2 shows a conducting element 200 and a bulk material 201. The conducting element may correspond to an electrode, such as a lithium (Li) electrode, wherein the lithium electrode may be extracted from a lithium bulk material. The conducting element may further correspond to a lithium titanate (LTO) electrode, wherein the lithium titanate electrode may be extracted from a lithium titanate bulk material. As may be appreciated by a person skilled in the art, the electrodes may comprise any other materials employed in battery systems, extracted from a corresponding bulk material.

Figure 3:
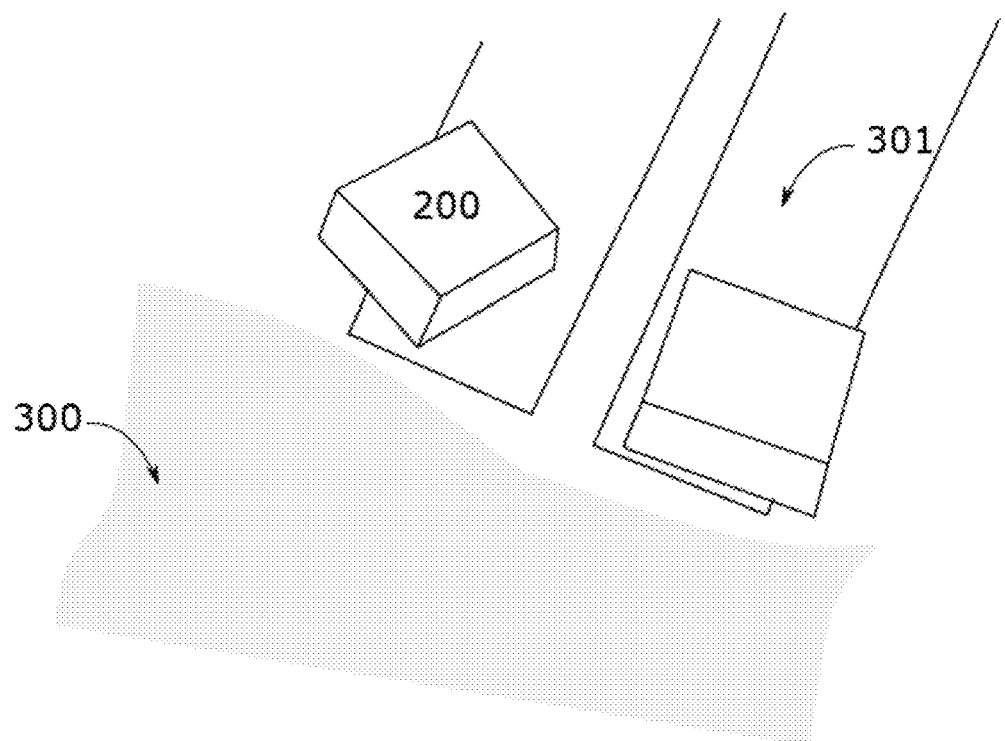
FIG. 3 shows a sample holder, two conducting elements and an ionic liquid.
Figure 3:
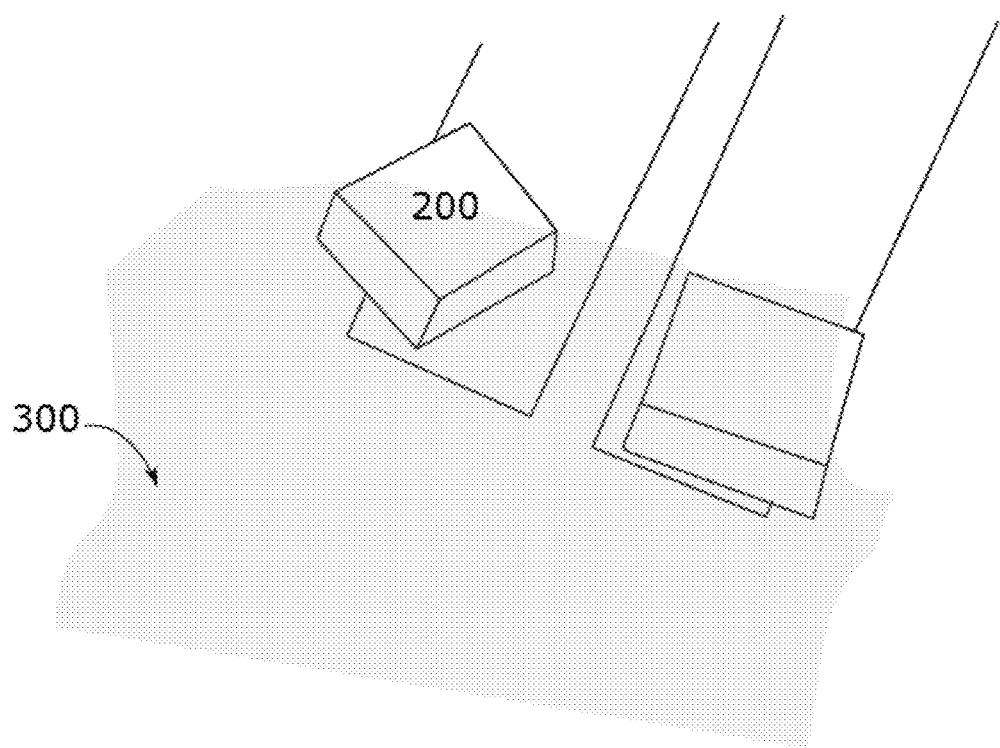

FIG. 3 shows a liquid 300 and a sample holder 301, wherein the sample holder may comprise two arms. However, the arms may be independent on the sample holder. For example, one electrode may be kept on a microscopic needle, wherein the needle may be connected to an electrical circuit. In the example of FIG. 3, each arm may be configured to provide a conducting contact to at least one of the conducting elements 200. The sample holder 301 may be comprised by a substrate, such as a MEMS chip. Furthermore, one conducting element 200 (e.g. lithium electrode) may be placed on each of the two arms of the sample holder. For example, a lithium electrode may be placed on one arm of the sample holder 301 and a lithium titanate electrode may be placed on the other arm of the sample holder 301. The liquid 300 may comprise organic cations, for example, 1-ethyl-3-methylimidazolium (EMIM), 1-butyl-3-methyl-imidazolium (BMIM), 1-octyl-3 methylimidazolium (OMIM), 1-decyl-3-methylimidazolium (DMIM), 1-butyl-2,3-dimethylimidazolium (DBMIM), 1-butyl-2,3-dimethyl-imidazolium (BMMIM), N-butyl-N-methylpyrrolidinium (PYR14), N-methyl-N-propyl pyrrolidinium (PMPyr), N-methyl-N-propylpiperidinium (PP13), N-methyl-N-propyl pyrrolidinium (PYR13), or other organic cations. The liquid 300 may be an ionic conductor. The liquid 300 may be moved towards the conducting elements 200 on the sample holder 301, and in particular towards an area between the two conducting elements 200. The process of transferring the liquid 300 is illustrated in the right part of the FIG. 3 where the liquid 300 is in between and partially on top of the conducting elements 200, thus connecting them.

Figure 4:
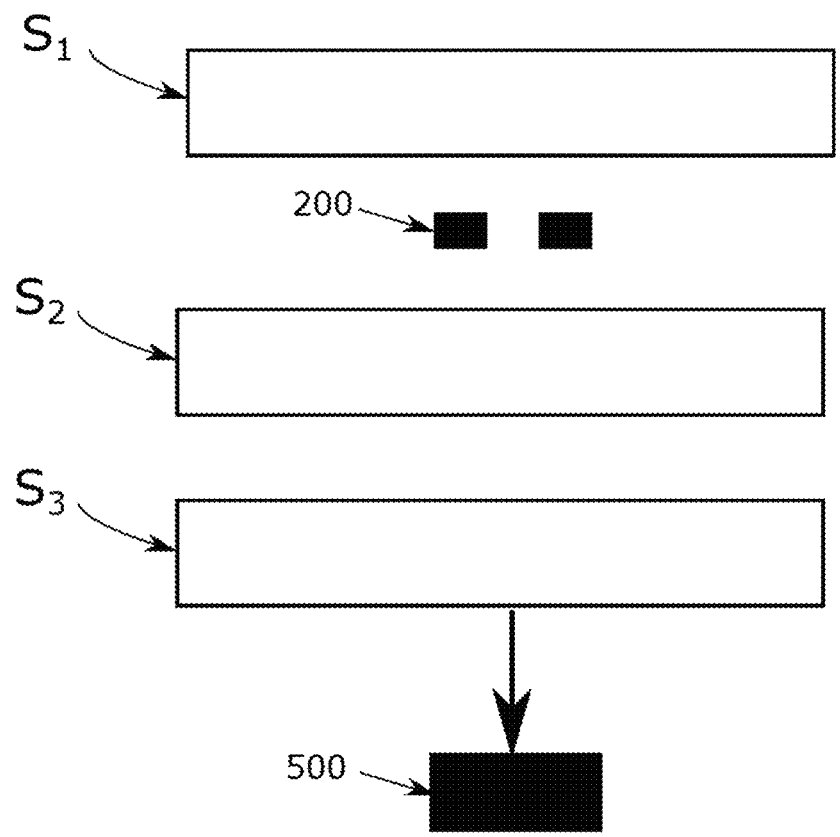
FIG. 4 shows an embodiment of a method.

FIG. 4 shows an exemplary flowchart for a method according to one embodiment of the present technology. A system may be configured for performing the method.

The method depicted in FIG. 4 may comprise 3 steps, a lift-out step S1, a transfer step S2 and a shaping step S3.

In a first step S1, that may be called a lift-out step, a plurality of conducting elements 200, for example 2 conducting elements 200, may be formed and extracted from a plurality of corresponding bulk samples, for example, two corresponding bulk samples. For example, a lithium electrode may be extracted from a lithium bulk sample and a lithium titanate electrode may be extracted from a lithium titanate bulk sample (as mentioned above). Each of the two conducting elements 200 is depicted through a small black box in the example of FIG. 4. The lift-out step may comprise milling (e.g. etching) an area of the respective bulk material by means of the ion beam. In particular, the ion beam may interact with the bulk sample and sputter atoms from the surface. A part of the bulk sample may thus be etched away, forming a conducting element 200 of certain dimensions. This is also depicted in FIG. 2. The etching depth may depend on the energy of the ion beam and on the total ion dose used for etching. The dose may be proportional to the ion beam current and the etching time.

A second step S2, that may be called a transfer step, may comprise removing and depositing the conducting elements 200 on the two arms of the sample holder 301. This step may be automated and may be performed by means of a microscopic needle, for example. The transfer step S2 may further comprise depositing the liquid 300 on to the substrate and close to the sample holder 301 by means of a pipette. In fact, the liquid may be placed at a distance of ~1 mm from the sample. The distance may be shorter than ~100 µm, when the deposition is done under an optical microscope and with a fine pipette fixed in the holder. Further, the step of transferring the liquid 300 on to the substrate may precede the step of transferring the two conducting elements 200 on to the substrate.

A third step S3, that may be called a shaping step, may comprise moving and shaping the liquid 300 by means of the ion beam. In particular, the method may comprise scanning the ion beam over a certain area on the liquid 300. The scanned area may correspond to an area of the sample being imaged. In fact, the method may comprise recording images of the sample while shaping the liquid. These images may be SEM or FIB images. The shaping step may comprise scanning and thus shaping the liquid over the whole imaged area based on one recorded image. However, the shaping step may also comprise performing multiple scans on a smaller section of the imaged area. Scanning the beam over the liquid 300 results in an interaction between the ions or electrons in the beam and the ions in the liquid 300. The interaction may comprise a thermal and/or electromagnetic interaction. In particular, the irradiation of the liquid 300 with the beam may result in an increased temperature of the liquid 300, wherein the increased temperature may subsequently decrease the liquid's viscosity. Thus, the liquid 300 can easily be guided and transferred to the desired location due to less friction between the liquid 300 and the substrate. The result of connecting the two conducting elements 200 via the liquid 300 may lead to the preparation of a microstructure capable of conducting ions. In the example of FIG. 4, the conducting microstructure may comprise a battery 500, such as a microscopic battery. The dimensions of the microscopic battery 500 are typically in units or tens of microns. Particularly, the battery dimensions may range from 0.1 μm to small hundreds of microns (up to approximately 200-300 μm). However, the prepared battery 500 may also be much larger than the aforementioned dimensions. The described flow can be used with a large piece of bulk used as one electrode (not prepared by FIB, just bulk forming, for example, one of the arms; size in cm to tens of cm) and the second electrode can be placed next to it using FIB and the liquid as well (last two according to FIG. 4). The battery may particularly comprise a Li-EMIM-LTO battery. The method may further comprise stopping the flow of the liquid 300 between the two conducting elements 200 once the two conducting elements 200 are connected by the liquid 300, which can be either observed using FIB or SEM imaging or measured in an electrical circuit, which contains the conducting elements 200. For example, such an electrical circuit may comprise a non-zero potential difference being created between the two arms of the sample holder 301 over which the conducting elements 200 may be placed. This potential difference may be created outside of the chamber in which the sample holder 301 may be housed, for example, the vacuum chamber 120 of the scanning microscope system 100 depicted in FIG. 1. A net flow of current through such a circuit may then indicate successful contact of the liquid 300 with both the conducting elements 200.

Figure 5:
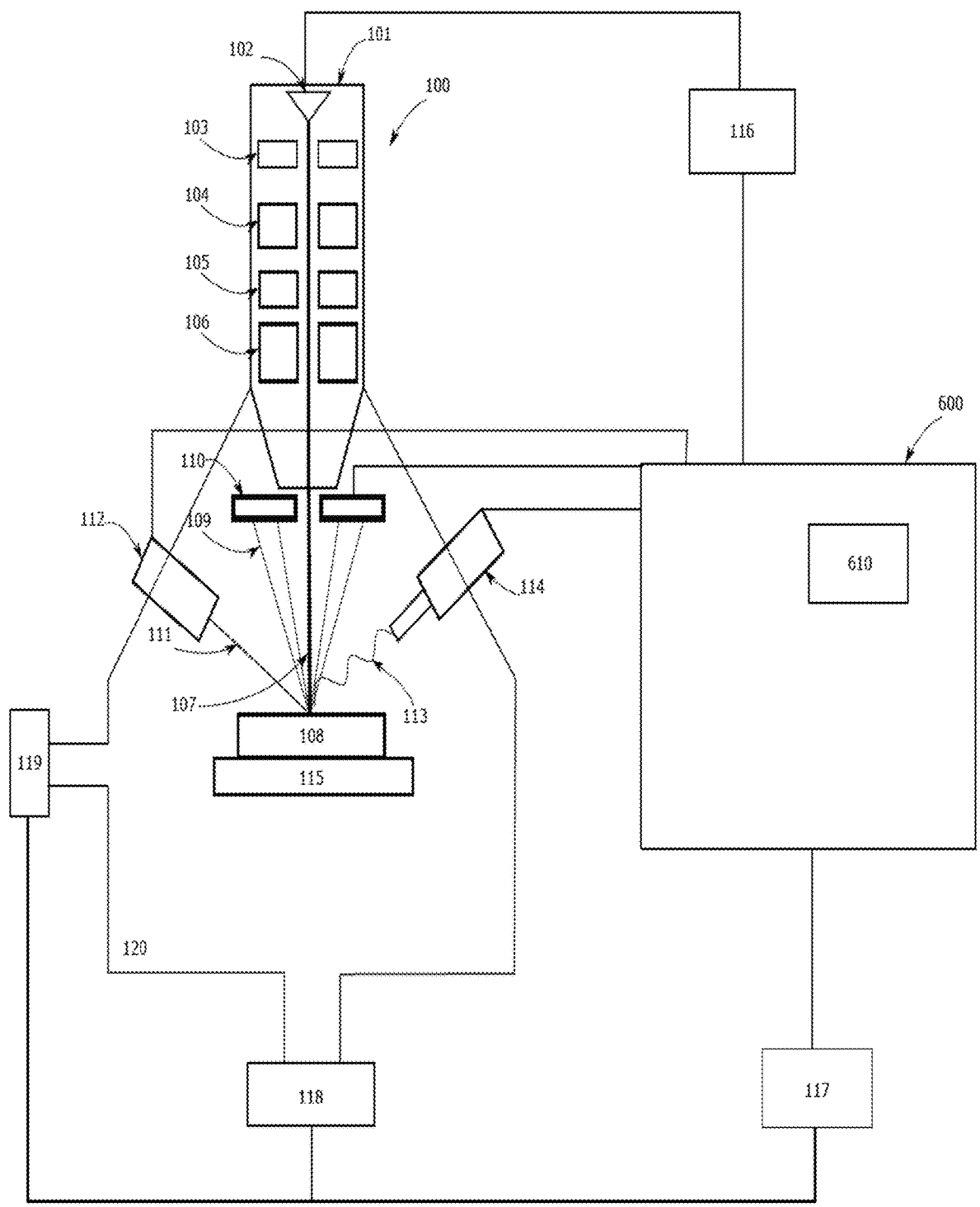
FIG. 5 shows a system configured for performing the method.

FIG. 5 shows a system. The system may be configured for performing the method as described above.

The system comprises the scanning microscope system 100 and a data-processing system 600.

The data-processing system 600 may comprise one or more processing units configured to carry out computer instructions of a program (i.e. machine readable and executable instructions). The processing unit(s) may be singular or plural. For example, the data-processing system 600 may comprise at least one of CPU, GPU, DSP, APU, ASIC, ASIP or FPGA.

The data-processing system 600 may comprise memory components, such as the data-storage component 610. The data-storage component 610 as well as the data-processing system 600 may comprise at least one of main memory (e.g. RAM), cache memory (e.g. SRAM) and/or secondary memory (e.g. HDD, SDD).

The data-processing system 600 may comprise volatile and/or non-volatile memory such an SDRAM, DRAM, SRAM, Flash Memory, MRAM, F-RAM, or P-RAM. The data-processing system 600 may comprise internal communication interfaces (e.g. busses) configured to facilitate electronic data exchange between components of the data-processing system 600, such as, the communication between the memory components and the processing components.

The data-processing system 600 may comprise external communication interfaces configured to facilitate electronic data exchange between the data-processing system 600 and devices or networks external to the data-processing system 600. In the example of FIG. 5, the external communication interfaces may be configured for facilitating an electronic connection between the processing components of the data-processing system 600 and components of the scanning microscope system 100, such as the control unit 116. Moreover, the external communication interfaces may be configured for establishing an electronic data exchange between the processing components of the data-processing system 600 and the vacuum controller 117.

Furthermore, the external communication interfaces may also be configured for establishing an electronic data exchange between the data-processing system 600 and the first, the second and the third detector (110, 112, 114). For example, the detected secondary electron data from every scan location may be stored in the data-storage component 610. The processing unit(s) of the data-processing system 600 may be configured for forming at least one image based on the stored secondary electron data.

The secondary electron image(s) of the sample may be stored in the data-storage component 610.

The data-processing system 600 may also comprise network interface card(s) that may be configured to connect the data-processing system 600 to a network, such as, to the Internet. The data-processing system 600 may be configured to transfer electronic data using a standardized communication protocol. The data-processing system 600 may be a centralized or distributed computing system.

The data-processing system 600 may comprise user interfaces, such as an output user interface and/or an input user interface. For example, the output user interface may comprise screens and/or monitors configured to display visual data (e.g. a secondary electron image of the sample or an X-ray spectrum) or speakers configured to communicate audio data (e.g. playing audio data to the user). The input user interface may comprise, e.g., a keyboard configured to allow the insertion of text and/or other keyboard commands (e.g. allowing the user to enter instructions to the scanning microscope system or parameters for the method) and/or a trackpad, mouse, touchscreen and/or joystick configured, for example, for navigating the secondary electron image or regions identified in the secondary electron image.

To put it simply, the data-processing system 600 may be a processing unit configured to carry out instructions of a program. The data-processing system 600 may be a system-on-chip comprising processing units, memory components and busses. The data-processing system 600 may be a personal computer, a laptop, a pocket computer, a smartphone, a tablet computer. The data-processing system 600 may comprise a server, a server system, a portion of a cloud computing system or a system emulating a server, such as a server system with an appropriate software for running a virtual machine. The data-processing system 600 may be a processing unit or a system-on-chip that may be interfaced with a personal computer, a laptop, a pocket computer, a smartphone, a tablet computer and/or user interfaces (such as the upper-mentioned user interfaces).

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

REFERENCE SIGNS 100 scanning microscope system
101 Focused Ion Beam microscope or Scanning Electron Microscope
102 charged particle source
103 extraction electrode
104 condensing lens
105 scanning coil(s) or scanning electrode(s)
106 objective lens
107 primary beam of charged particles
108 sample
109 emissions of backscattered electrons
110 first detector
111 emissions of secondary electrons and/or secondary ions
112 second detector
113 emissions of X-ray photons
114 third detector
115 movable stage
116 control unit
117 vacuum controller
118 mechanical pumping system
119 (ultra-)high vacuum pump
120 vacuum chamber
200 conducting element
201 bulk material
300 ionic liquid
301 sample holder
S1 lift-out step
S2 transfer step
S3 shaping step
500 microscopic battery
600 data-processing system
610 data-storage component

The invention claimed is:

1. A method for preparing and/or processing a sample, wherein:
the sample comprises at least one fluid and a plurality of conducting elements; and
the method comprises:
directing a charged particle beam onto the at least one fluid and causing the at least one fluid to flow in response to the charged particle beam being directed on to it, and
performing a lift-out step wherein the lift-out step comprises milling and removing the plurality of conducting elements from a plurality of corresponding bulk samples.

2. The method of claim 1, wherein the at least one fluid comprises an electrical conductor.

3. The method of claim 1, wherein the at least one fluid comprises an ionic liquid.

4. The method of claim 1, wherein the charged particle beam comprises a plurality of charged particles.

5. The method of claim 1, wherein the plurality of conducting elements comprise electrodes such that one conducting element comprises an anode and another conducting element comprises a cathode.

6. The method of claim 1, wherein the method further comprises a transfer step, wherein the sample comprises a substrate, and wherein the transfer step comprises transferring any of the plurality of conducting elements on to the substrate.

7. The method of claim 6, wherein the substrate comprises a sample holder comprising a plurality of arms, each configured to provide a conducting contact to at least one of the plurality of conducting elements, and wherein the transfer step further comprises transferring any conducting element onto any of the plurality of arms of the sample holder, and wherein the method further comprises monitoring the flow of the at least one fluid in response to the charged particle beam being directed on to it, wherein monitoring the flow of the at least one fluid further comprises connecting each of the plurality of arms to a voltage source such that a non-zero potential difference can be generated between any two of the plurality of arms and stopping the flow of the at least one fluid between the two conducting elements once a non-zero current is measured between an anode and a cathode of the plurality of conducting elements.

8. The method of claim 1, wherein the plurality of conducting elements are located a distance greater than 1 nm from each other, and wherein a result of the flow of the at least one fluid in response to the charged particle beam being directed on to it comprises transferring, at least a part of, the fluid to an area of the sample, wherein the area corresponds to a gap between conducting elements.

9. The method of claim 1, wherein the method further comprises monitoring the flow of the at least one fluid in response to the charged particle beam being directed on to it, wherein monitoring the flow of the at least one fluid further comprises imaging the sample.

10. A system comprising a scanning microscope system and a data processing system including a data storage component storing a computer program product, wherein the system is configured for preparing and/or processing a sample, wherein the sample comprises at least one fluid and a plurality of conducting elements, the data processing system being configured to execute the computer program product to cause the system to:
direct a charged particle beam onto the at least one fluid causing the at least one fluid to flow in response to the charged particle beam being directed on to it, and
perform a lift-out step wherein the lift-out step comprises milling and removing the plurality of conducting elements from a plurality of corresponding bulk samples.

11. The system of claim 10, wherein the system, particularly the scanning microscope system, comprises an electro-optical system configured to direct and/or focus the charged particle beam, and wherein the system, particularly the data processing system, is further configured to control the electro-optical system, and wherein the data processing system is configured to control the direction and/or focus of the charged particle beam by controlling the electro-optical system.

12. The system of claim 11, wherein the system, particularly the scanning microscope system, is configured for scanning the charged particle beam over a plurality of scan locations in one, two or three dimensions across the at least one fluid, and wherein a result of scanning the charged particle beam over the scan locations across the at least one fluid comprises an interaction of the charged particle beam with the at least one fluid.

13. The system of claim 12, wherein the system, particularly the scanning microscope system, is further configured to image the sample by detecting emissions arising from the interaction of the charged particle beam with the at least one fluid, and wherein the system is configured to display the sample images on a display and to allow monitoring the flow of the at least one fluid based on the images displayed.

14. Non-transitory computer readable instructions that, when run on a data processing system, causes a scanning microscope system containing a sample that comprises at least one fluid and a plurality of conducting elements to:
  direct a charged particle beam onto the at least one fluid causing the at least one fluid to flow in response to the charged particle beam being directed on to it; and
  perform a lift-out step wherein the lift-out step comprises milling and removing the plurality of conducting elements from a plurality of corresponding bulk samples.

15. The non-transitory computer readable instructions of claim 14, wherein the plurality of conducting elements comprise electrodes such that one conducting element comprises an anode and another conducting element comprises a cathode.

16. The non-transitory computer readable instructions of claim 15, wherein the instructions further cause the scanning microscope system to perform a transfer step, wherein the sample comprises a substrate, and wherein the transfer step comprises transferring any of the plurality of conducting elements on to the substrate.

17. The non-transitory computer readable instructions of claim 14, wherein the substrate comprises a sample holder comprising a plurality of arms, each configured to provide a conducting contact to at least one of the plurality of conducting elements, and wherein the transfer step further comprises transferring any conducting element onto any of the plurality of arms of the sample holder, and wherein the instructions further cause the scanning microscope system to monitor the flow of the at least one fluid in response to the charged particle beam being directed on to it, wherein monitoring the flow of the at least one fluid further comprises connecting each of the plurality of arms to a voltage source such that a non-zero potential difference can be generated between any two of the plurality of arms and stopping the flow of the at least one fluid between the two conducting elements once a non-zero current is measured between an anode and a cathode of the plurality of conducting elements.

18. The non-transitory computer readable instructions of claim 15, wherein the plurality of conducting elements are located a distance greater than 1 nm from each other, and wherein a result of the flow of the at least one fluid in response to the charged particle beam being directed on to it comprises transferring, at least a part of, the fluid to an area of the sample, wherein the area corresponds to a gap between the two conducting elements.

* * * * *